United States Patent [19]

Park et al.

[11] Patent Number: 4,967,071
[45] Date of Patent: Oct. 30, 1990

[54] FIBER OPTIC POSITION SENSOR

[75] Inventors: Kyong Park, Thousand Oaks; Marcos A. Nassar, Los Angeles; Cliff C. Sun, Simi Valley, all of Calif.

[73] Assignee: Kavlico Corporation, Moorpark, Calif.

[21] Appl. No.: 322,418

[22] Filed: Mar. 10, 1989

[51] Int. Cl.⁵ ................................................ H01J 5/16
[52] U.S. Cl. ............................ 250/227.21; 250/231.10
[58] Field of Search ............. 250/227, 231 SE, 237 G, 250/227.21, 231.10; 350/96.15

[56] References Cited

U.S. PATENT DOCUMENTS

| | | | |
|---|---|---|---|
| 3,759,605 | 7/1988 | Shen et al. | 350/96.15 |
| 3,867,037 | 2/1975 | Litke | 356/169 |
| 3,975,633 | 8/1976 | Larkin | 250/227 |
| 4,116,000 | 9/1978 | Martin et al. | 60/242 |
| 4,117,460 | 9/1978 | Walworth et al. | 250/227 |
| 4,286,145 | 8/1981 | Palmer | 235/454 |
| 4,356,395 | 10/1982 | Miller | 250/227 |
| 4,633,224 | 12/1986 | Gipp et al. | 340/347 |
| 4,741,585 | 5/1988 | Uken | 350/96.15 |
| 4,871,907 | 10/1989 | Lux et al. | 250/237 G |

*Primary Examiner*—David C. Nelms
*Attorney, Agent, or Firm*—Poms, Smith, Lande & Rose

[57] ABSTRACT

An optical fiber position sensor utilizes a passive gray code encoded sensor head gray code for improved reliability. Optical energy is propagated to the sensor head over a plurality of optical fibers. At the sensor head, the optical energy is either reflected back along the same fiber or absorbed by the sensor head. The presence or absence of reflected optical energy on each fiber determine each bit state for a digital word. The sensor head is attached to a device to be monitored. Movement of the device causes translatory displacement of the sensor head relative to the fibers, thereby changing at least one bit state.

5 Claims, 2 Drawing Sheets

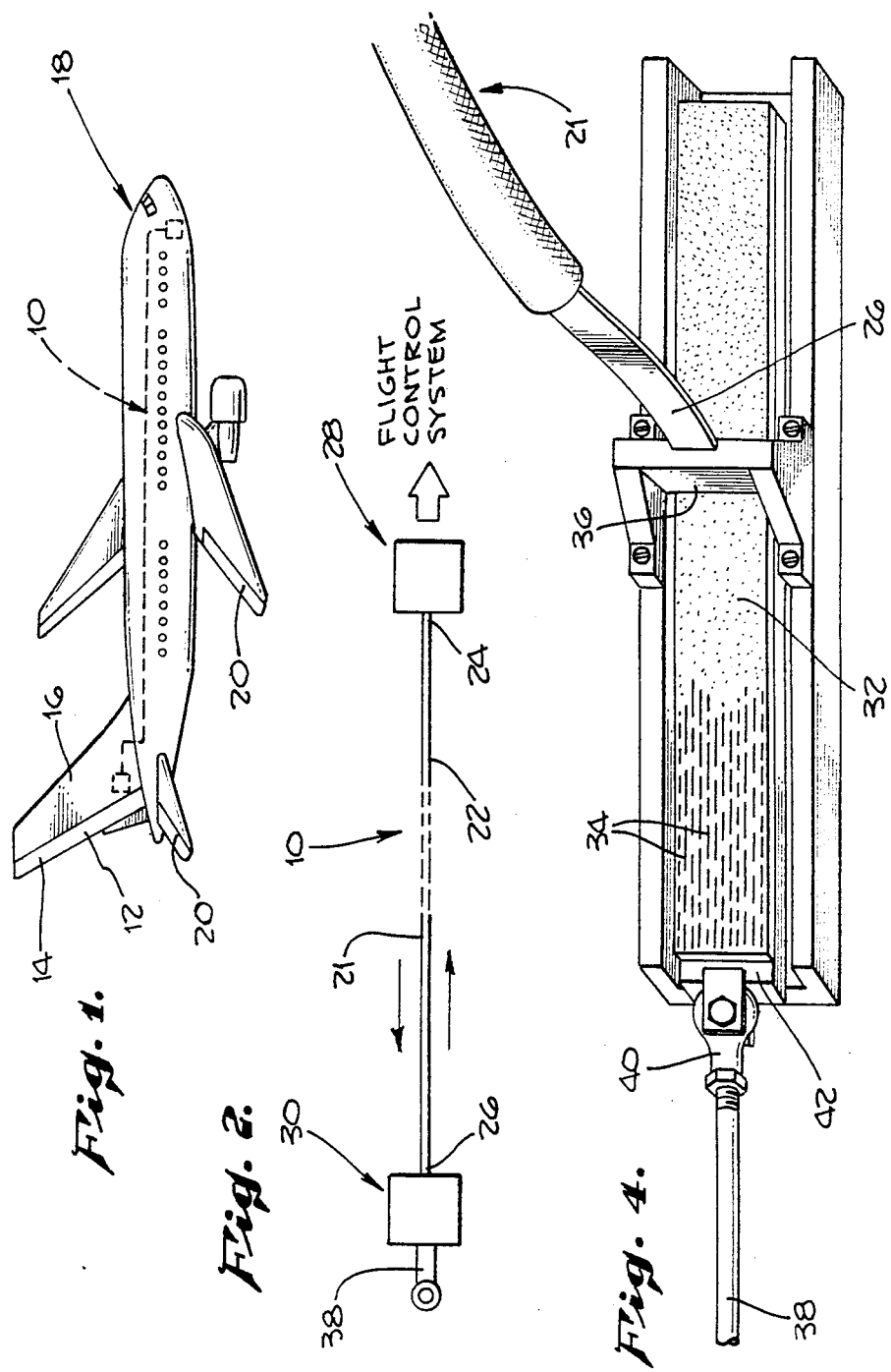

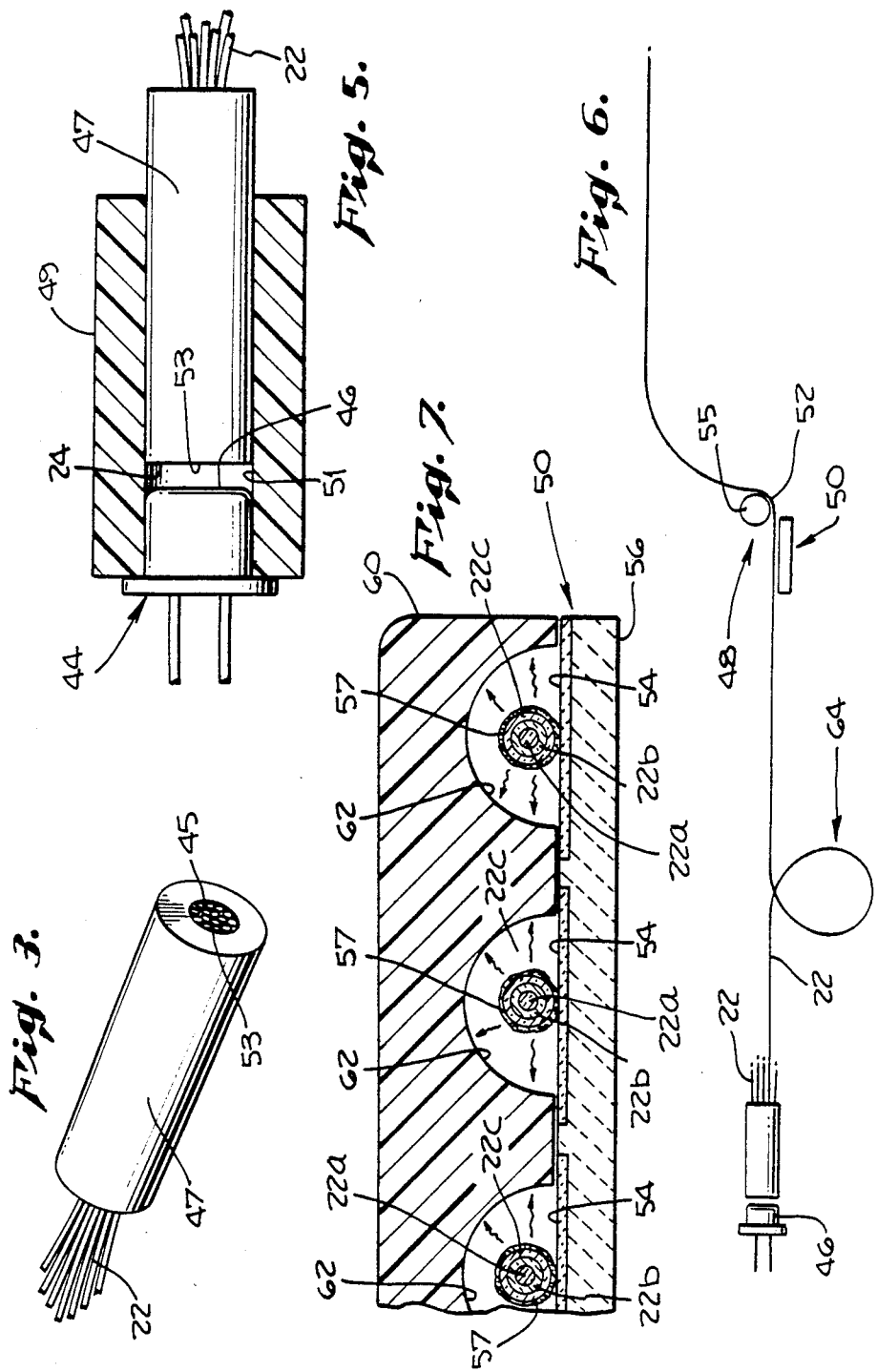

FIBER OPTIC POSITION SENSOR

BACKGROUND OF THE INVENTION

1. Field of the Invention

The present invention relates generally to position sensors and more particularly to a novel fiber optic position sensor.

2. Description of Related Art

In order to control the flight altitude of aircraft, control surfaces located on the wings, stabilizer and tail enable the cockpit crew to control various aspects of flight. These control surfaces are controlled through the manipulation of cockpit controls. Basic example of such control surfaces include ailerons, elevator and rudder.

In early aircraft, these control surfaces were connected directly to the cockpit control by cables which were routed throughout the aircraft. As aircraft became increasingly more complex, the number of control surfaces increased, requiring the addition of further cables and the hardware necessary to route such cables. Of course, the addition of cables and hardware disadvantageously adds to the total weight of the aircraft.

More recently, hydraulic lines and actuators were substituted for the cables. Hydraulic systems allowed a further improvement of servo boost being applied to the associated hydraulic actuators to reduce the amount of force needed on the cockpit controls to move the control surfaces. However, as with cable actuated systems, hydraulic actuated control surfaces also require additional hardware that has to be attached to the airframe which adds weight to the aircraft, requiring greater thrust and fuel carrying capabilities. Furthermore, both cable and hydraulic systems require frequent maintenance and upkeep to assure reliability during the flight.

To alleviate the above disadvantages, "fly by wire" systems have been developed for modern aircraft In such systems, the cockpit controls do not directly act on the control surfaces by mechanical or hydraulic means. Instead, an electrical signal is developed as a function of the position of the cockpit control and this signal is transmitted through electrical wiring to an electromechanical or hydraulic actuator near the respective control surface. The actuator then moves the control surface in response to this position to achieve the desired position The position of the control surface must then also be monitored to assure that correct flight attitude is maintained. Typically, a transducer converts spatial information into a an electrical signal, and this signal is transmitted back to the cockpit to activate a display. A flight control computer manages all such incoming signals from the transducers and the displays.

Although such electrical systems are inherently more reliable than mechanical systems, electrical systems are subject to electromagnetic interference (EMI) and electromagnetic pulses (EMP) which may cause erroneous readings from the position sensors located at the control surfaces to be transmitted to the flight control computer. Furthermore, remote electronic position sensors are active devices which require additional wiring and power to be delivered to them increasing the complexity of the aircraft wiring and systems, thereby reducing overall reliability.

SUMMARY OF THE INVENTION

Accordingly, it is a feature of the present invention to provide remote position sensing by interconnecting actuators near the control surface to the flight computer by optical fibers. Optical fibers have advantages of being immune to EMI and EMP, of being significantly lighter than electrical cables, and of being safe in potentially flammable or explosive environments since possibilities of electrical sparks are eliminated.

Accordingly, the present invention is directed to a fiber optic position sensor in which optical energy is propagated from a first end portion of a plurality of optical fibers to their second end portion. At the second end portion of the optical fibers, the optical energy is selectively reflected or absorbed as a function of the present position of the device to be monitored. Reflected optical energy is redirected along the same optical fiber from which it has been received The presence or absence of reflected optical energy in each fiber is detected to develop a digital word. The value of each of the bits of the digital word is determined by the presence or absence of the reflected optical energy on a respective one of the optical fibers. The digital word thus conveys information of the present position of the device being monitored.

A novel optical detector for detecting the reflected energy includes means for transferring the reflected optical energy at a selected location along the optical fiber into its coating and externally of the coating through scattering, and further includes means for developing an electrical signal for each of the above bits in response to the scattered optical energy along each fiber. In one embodiment of the present invention, the scattering means include a sharp bend in each optical fiber proximate to the selected location. Subsequent to the reflected optical energy propagating through said bend, it is transferred first into the cladding of the fiber and then into its coating. White paint is applied to a segment of the coating to further scatter the optical energy externally of the fiber. An advantage of the optical detector of the present invention is that the reflected optical energy may be detected directly from the optical fiber which obviates the need for a directional coupler to be provided for each optical fiber, as is commonly used in prior art.

These and other advantages, objects and features of the present invention will become more apparent to those skilled in the art from the study of the following description when read in conjunction with the attached drawing and appended claims.

BRIEF DESCRIPTION OF THE DRAWINGS

FIG. 1 shows an optical fiber position sensor system constructed according to the principals of the present invention located at an exemplary location in a commercial airliner;

FIG. 2 diagrammatically illustrates the sensor and decoder units of the present invention interconnected by optical fibers;

FIG. 3 shows a portion of the fiber optic cable of FIG. 2;

FIG. 4 is a more detailed representation of the sensor head of FIG. 2;

FIG. 5 shows, partially in cross-section, a portion of the decoder of FIG. 3;

FIG. 6 is a schematical representation of another portion of the decoder of FIG. 2; and FIG. 7 is a cross-sectional view of the optical energy scatterer of FIG. 6.

DESCRIPTION OF THE PREFERRED EXEMPLARY EMBODIMENT

Referring now to FIG. 1, there is shown the fiber optic position sensor 10 for sensing the position of a device 12. The device 12 is exemplarily shown as a rudder 14 in the vertical stabilizer 16 of a commercial aircraft 18. The fiber optic position sensor 10 of the present invention may be used to monitor the position of any of the other control surfaces 20 of the aircraft 18. It is to be understood that the fiber optic position sensor 10 of the present invention is not limited to use in conjunction with the aircraft 18, but can be equally adapted, as will become apparent to those skilled in the art from the following description, to any mechanical system in which the position of a device needs to be monitored or detected Referring now also to FIGS. 2 and 3, the fiber optic position sensor 10 includes a fiber optic cable 21 having a plurality of optical fibers 22. Each of the optical fibers 22 has a first end portion 24 and a second end portion 26. Sensor 10 further includes means 28 for developing optical energy propagating along each of the fibers 22 from their first end portion 24 toward their second end portion 26 and means 30 for selectively reflecting and absorbing optical energy received at the second end portion 26 of each of the fibers 22 as function of the present position of the device 12.

Reflecting means 30 reflects optical energy from the second end portion 26 to the first end portion 24 of each of the fibers 22 along the same one of such fibers 22 from which the optical energy has been received Developing means 28 is further for detecting an absence or a presence of reflected optical energy along each of the fibers 22 to develop a digital word. The digital word has a plurality of bits, each of the bits corresponding to a respective one of the optical fibers 22. The absence or presence of reflected optical energy and each of the fibers 22 correspondence to a first or second primary state for each respective one of the bits. Accordingly, the digital word conveys information of the present position of the device 12.

Referring now to FIG. 4, reflecting and absorbing means 30 includes an optical encoder 32 adapted for transitory displacement in proportion to movement of the device 12. The optical encoder 32 has a plurality of encoded channels 34, each of the channels 34 being associated with a respective one of the optical fibers 22.

Reflecting and absorbing means 30 further includes an optical head 36 adapted to dispose the second end portion 26 of each of the optical fibers 22 proximate to a respective one of each of the encoded channels 34 in a facing relationship thereto When optical radiation propagated to the second end portion 26 of the optical fibers 22 is incident upon the encoded channels 34, the radiation is selectively reflected or absorbed by each encoded channel in accordance with the position the optical encoder 32. The optical encoder may be encoded with any binary code. In a preferred embodiment of the present invention, the optical encoder 32 is encoded with a gray code which has an advantage of minimizing errors. As is known in the art, only one bit of the digital word is allowed to change state for each increment of the digital word.

In a preferred embodiment of the present invention, there are twelve encoded channels 34 which enables a 0.25% resolution. A total stroke of six inches of the optical encoder 32 may be provided in a preferred embodiment of the present invention.

Accordingly, as best seen in FIG. 3, there are twelve such optical fibers 22, one for each encoded channel 34. In order to measure position of the device 12, the optical encoder 32 is connected to the device 12 through a shaft 38. The shaft is connected to the optical encoder through a miniature double ball joint 40 that provides immunity to any shaft misalignment or deformation.

Optical encoder 32 may, in one embodiment of the present invention, be a pyrex glass substrate with an aluminum coating on which the above mentioned gray code is chemically etched using photo lithographic methods, and a dielectric coating applied thereof to protect the aluminum surface. Aluminum is preferred for its high reflectivity to infrared optical energy. However, gold or chrome can also be used with the advantages of more durable surface. A highly polished metallic substrate with laser etched encoding pattern can also be used as an alternative to the glass substrate. The optical head 36 positions the second end portion 26 of the optical fibers 22 at approximately 75 microns or less from the surface of the optical encoder 32. In order to maintain this tolerance along the whole length of the optical encoder 32 regardless of vibrations or other environmental effects, the substrate of the optical encoder 32 is mounted on an inverted ball bearing slide 42, as best seen in FIG. 4, and the optical head 36 is mounted to the body of the ball bearing slide 42. This results in a very stable assembly that eliminates the need of careful alignment of the shaft 38 with the optical head 36.

Referring further to FIG. 5, developing means 28 includes means 44 for illuminating the first end portion 24 of each of the optical fibers 22 to develop the propagating optical energy therein Illuminating means 44 may include a light emitting diode (LED) 46, the LED 46 illuminating the first end portion 24 of each of the optical fibers 22. Proximate to the LED 46, the optical fibers are epoxy bonded together and disposed within an axial bore 45 of a ferrule 47. Ferrule 47 may be constructed from any suitable metal or ceramic material. A cylindrical sleeve 49 has an axial bore 51 which receives the LED 46 at one end and the ferrule 47 at the other end thereof. The ferrule 47 and the optical fibers 22 at their first end portion are polished at a surface 53 where they face the LED 46.

Referring now to FIGS. 6 and 7, the detecting function of the developing means 28 includes means 48 for scattering the reflected optical energy externally of the fibers 22 when present in each of the optic fibers 22 and means 50 responsive to the scattered reflected optical energy in each of the optical fibers 22 for developing the digital word.

Scattering means 48 includes a relatively sharp bend 52 each of the optical fibers 22. The reflected optical energy is scattered externally of each of the optical fibers 22 subsequent to the propagation through the bend 52 but not before the bend 52. Subsequent to the propagating optical energy traversing through the bend 52 the optical energy in the core 22a of each optical fiber 22 is transferred into the cladding 22b and coating 22c thereof. The optical energy is then scattered externally of the optical fiber 22 from its coating 22c. Therefore, only the reflected energy is scattered on the side of the bend 52 nearest the LED 46. A mandrel 55 may be provided around which the optical fibers are bent. An alternative to the mandrel 55 is a substrate having a bent groove therein with the fiber 22 received within the groove.

The digital word developing means 50 includes a plurality of photodiodes 54 in a semi-conductor substrate 56. Each of the photodiodes 54 are disposed proximate to an associated one of the optical fibers 22 to detect scattered optical energy and to develop one of the first or second binary states for the digital word. Accordingly, photodiodes 54 each develop a digital signal having a first or second binary state in accordance with the presence or absence of reflected optical energy and the respected one of optical fibers 22, the digital word being therefor an electronic digital signal. In one embodiment of the present invention, each of the optical fibers 22 includes a layer of white paint 57 applied to the coating 22c of each optical fiber 22 where it overlies the photodiode 54. The white paint 57 absorbs optical energy from the coating 22c and scatters the optical energy radially from the fiber 22. The white paint 57 further increases the efficiency of the scattering of optical energy externally of the fiber 22.

Scattering means 48 further includes means 58 for focusing externally scattered optical energy from each of the optical fibers 22 to the associated one of the photodiodes 54. Reflecting means 58 is a plate 60 having a plurality of U-shaped or semicircular grooves 62 used to reflect and focus the scattered light onto the photodiodes 54. Each groove is dimensioned to receive one optical fiber 22 to isolate each channel and minimize cross talk.

Intermediate the first end portion 26 of the optical fibers 22 and bend 52, indicated generally at 64, a length of about 50 cm of the fibers 22 are coated with black paint and wound around a mandrel (not shown) This section of the optical fibers 22 eliminates light launched into the cladding 22b and coating 22c to reduce background noise.

Above described is a low cost and highly reliable sensor system suitable for aircraft applications. By adding fiber optic couplers and multiplexed detector arrays, the same decoder unit can be used for several sensor heads if desired.

It should be understood that the above invention has been described with reference to a particular embodiment thereof. Those skilled in the art may now make numerous uses of the modifications to the present invention without departing from the inventive concepts therein. Accordingly, the present invention is to be defined solely by the scope of the appended claims.

What is claimed is:

1. An optical detector for sensing one of a presence or an absence of optical energy in an optical fiber, said optical fiber having a core through which said energy propagates, a cladding surrounding said core and a coating surrounding said cladding, said detectors comprising:
   a sharp bend in said optical fiber at a selected location thereof, said optical energy being transferred from said core into said cladding and further transferred to said coating subsequent to propagating through said bend and scattered externally of said coating at said selected locations;
   a semiconductor substrate having an upper surface;
   a photodiode fabricated in said top surface of said semiconductor substrate, said substrate being arranged such that said photodiode is disposed adjacent said fiber at said selected location, said photodiode developing an electrical signal in response to optical energy being incident thereon; and
   a plate juxtaposed said upper surface, said plate having a semicircular channel, said fiber being received through said channel, said channel reflecting and focusing external optical energy toward said photodiode.

2. An optical detector is set forth in claim 1 further comprising:
   a layer of white paint disposed on said coating at said selective locations, said white paint enhancing scattering of optical energy radially from said fiber.

3. An optical detector for sensing one of a presence or an absence of optical energy in each one of a plurality of optical fibers in a fiber optic cable, each of said optical fibers having a core through which said energy propagates, a cladding surrounding said core and a coating surrounding said cladding, said detector comprising:
   a sharp bend in each of said optical fibers at a selected location thereof, said optical energy being transferred from said core of each of said fibers into said cladding and further transferred into said coating subsequent to propagating through said bend and scattered externally of said coating at said selected location;
   a semiconductor substrate having an upper surface;
   a plurality of photodiodes fabricated in said upper surface of said semiconductor substrate, said substrate and said fibers being arranged such that each of said photodiodes is disposed adjacent a respective one of said fibers at said selected location, each of said photodiodes developing an electrical signal and response to optical energy being incident thereon, each electrical signal determining the state of a respective one of a plurality of bits of a digital signal wherein said state of each of said bits is indicative of one of said presence or said absence of optical energy along said respective one of said fibers; and
   a plate juxtaposed said upper surface, said plate having a plurality of semicircular channels, each of said optical fibers being received through a respective one of said channels, each of said channels reflecting and focusing external optical energy toward said respective one of said photodiodes.

4. An optical detector is set forth in claim 3 further comprising:
   a layer of white paint disposed on said coating of each of said fibers at said selected location, said white paint enhancing scattering of optical energy radially from said fibers.

5. A fiber optic position sensor for sensing the position of a device comprising:
   a plurality of optical fibers, each of said fibers having a first end portion and a second end portion;
   a light emitting diode, said light emitting diode being adapted to illuminate said first end portion of each of said optical fibers such that optical energy propagates along each of said fibers in a direction from said first end portion to said second end portion;
   an optical encoder adapted for a transitory displacement in proportion to movement of said device, said encoder having a plurality of encoded channels, each of said channels being associated with the respective one of said fibers;
   an optical head adapted to position said second end portion of each of said optical fibers proximate to a respective one of each of said channels in a facing relationship thereto, said optical energy in each of said fibers being selectively reflected in each of said channels of said optical encoder as function of said present position of said device, such that reflected optical energy propagates from said second end portion to said first end portion along said each of said fibers from which said optical energy has been received;

a sharp bend in each of said optical fibers, said reflected optical energy being scattered externally of each of said optical fibers subsequent to propagation through said bend;

a semiconductor substrate having an upper surface;

a plurality of photodiodes fabricated in said top surface of said semiconductor substrate, said substrate and said fibers being arranged such that each of said photodiodes is disposed proximate to a respective one of said optical fibers to detect scattered optical energy wherein each of said photodiodes develops one of a first binary state and a second binary state for each bit in a digital word, said digital word being an electronic digital signal; and a plate juxtaposed said upper surface having a plurality of semicircular channels, each of said fibers being received through a respective one of said channels, said channels reflecting and focusing external optical energy toward said respective one of said photodiodes.

* * * * *